No. 731,002. Patented June 16, 1903.

UNITED STATES PATENT OFFICE.

JAMES WILLIAMS, OF HACKNEY WICK, LONDON, ENGLAND, ASSIGNOR TO THE ORIENTAL WATERPROOF SYNDICATE, LIMITED, OF HACKNEY WICK, LONDON, ENGLAND.

METHOD OF WATERPROOFING AND ROTPROOFING TEXTILE FABRICS.

SPECIFICATION forming part of Letters Patent No. 731,002, dated June 16, 1903.

Application filed April 11, 1902. Serial No. 102,460. (No specimens.)

*To all whom it may concern:*

Be it known that I, JAMES WILLIAMS, a subject of the King of Great Britain and Ireland, residing at Vulcan Works, Windsor road, Hackney Wick, in the county of London, England, have invented a new and useful Improved Method of Waterproofing and Rotproofing Textile Fabrics, of which the following is a specification.

This invention relates to improved means for treating textile fabrics with a view to rendering them water-repellent and rot-proof; and it consists in impregnating them with a cupreous solution prepared with the aid of carbonate of ammonia.

In carrying out my invention I prepare a cupric solution by forcing oxygen gas or air through a solution of carbonate of ammonia contained in a vessel charged with copper-cuttings. The action of the oxygen gas or air is maintained until the solution becomes sufficiently charged with copper. I have found forty-five pounds of carbonate of ammonia to one hundred gallons of water a convenient proportion, the solution becoming charged with from one to three per cent. of copper in from six to twelve hours. Having thus prepared the solution of copper, the textile fabric intended to be rendered water-repellent and rot-proof is soaked therein or impregnated therewith and then dried.

What I claim as my invention, and desire to secure by Letters Patent, is—

1. The herein-described method of rendering fabrics water-repellent and rot-proof, consisting in treating copper-cuttings with a solution of carbonate of ammonia in the presence of atmospheric air or oxygen, impregnating the fabric with the cupric solution and then drying it.

2. For rendering fabrics water-repellent and rot-proof, the employment of a cupric solution formed by dissolving copper in a solution of carbonate of ammonia in the presence of free oxygen.

In testimony whereof I have signed my name to this specification in the presence of two subscribing witnesses.

JAMES WILLIAMS.

Witnesses:
PERCY E. MATTOCKS,
EDMUND S. SNEWIN.